UNITED STATES PATENT OFFICE.

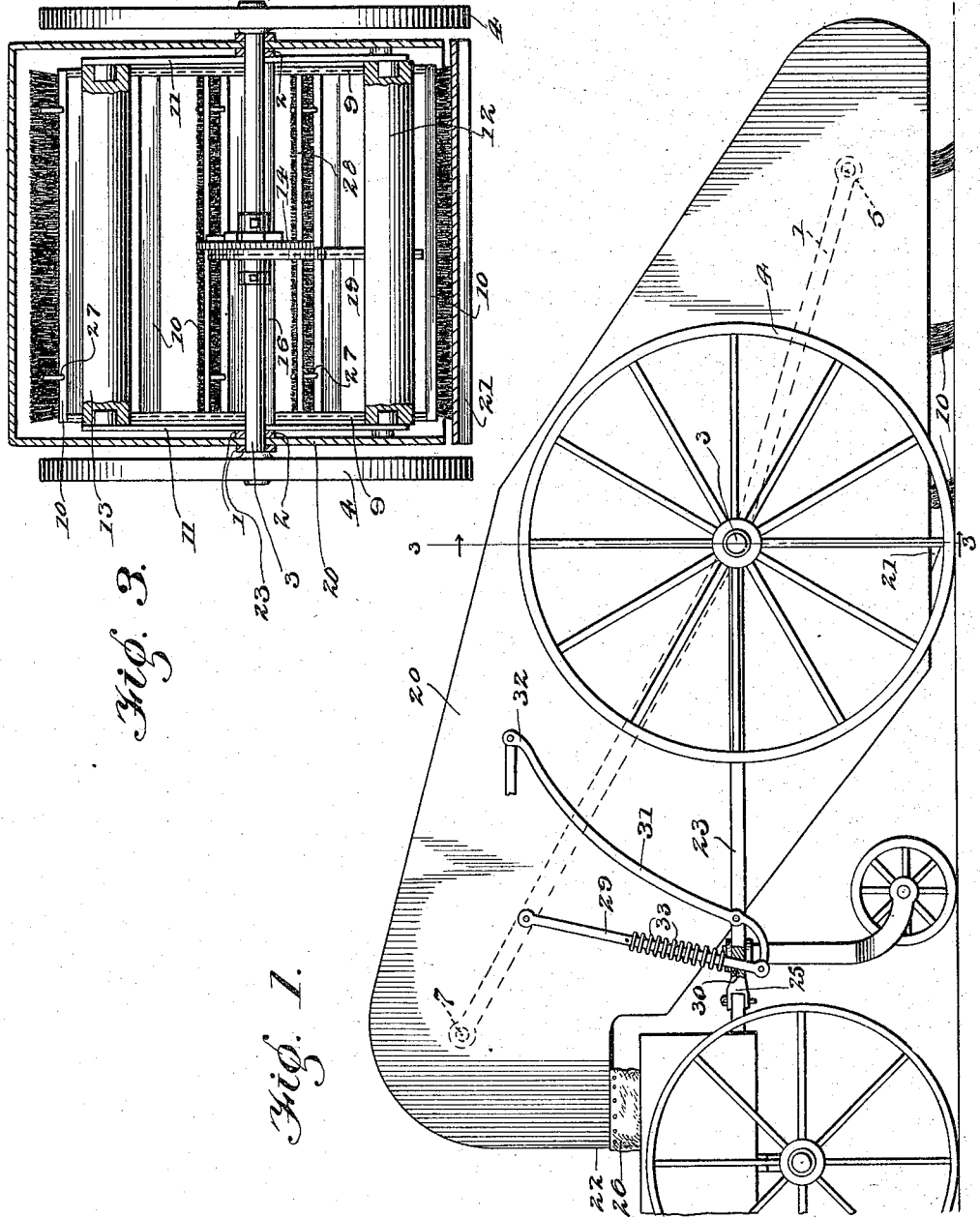

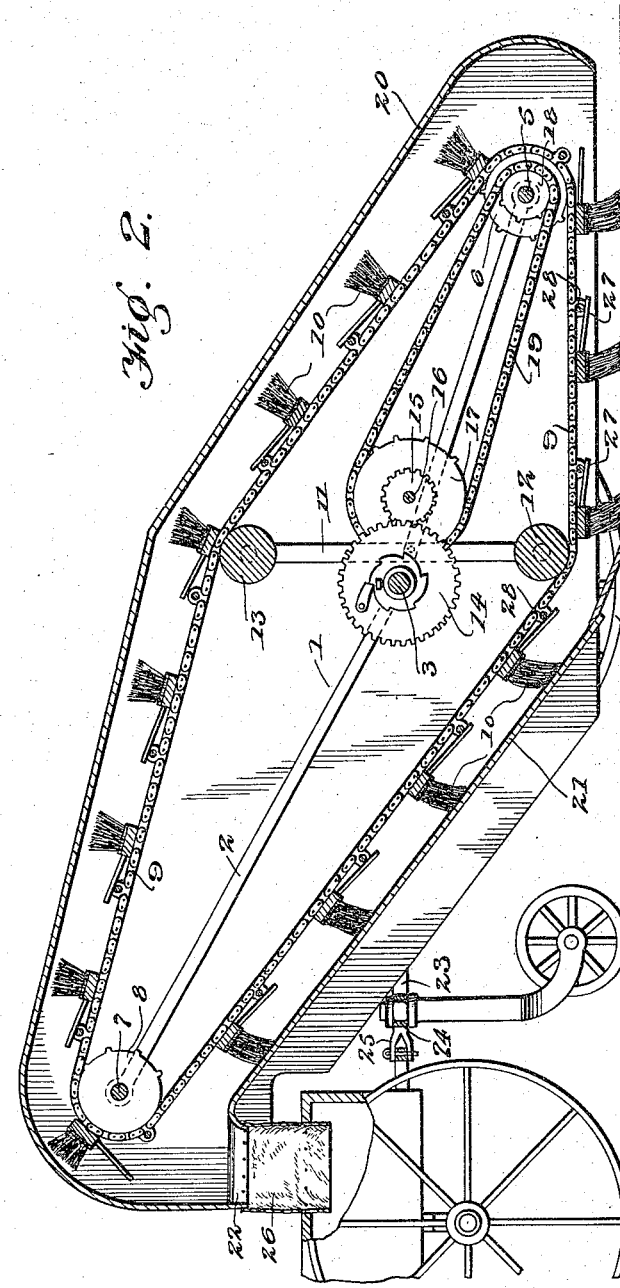

LEWIS J. LOCKWOOD, OF SANTA ROSA, CALIFORNIA.

STREET-SWEEPING MACHINE.

1,145,324. Specification of Letters Patent. Patented July 6, 1915.

Application filed July 22, 1914. Serial No. 852,437.

*To all whom it may concern:*

Be it known that I, LEWIS J. LOCKWOOD, a citizen of the United States, residing at Santa Rosa, in the county of Sonoma and State of California, have invented new and useful Improvements in Street-Sweeping Machines, of which the following is a specification.

This invention relates to improvements in street sweeping machines and has particular application to a machine adapted to be connected with a wagon or wheeled receptacle and drawn along thereby.

In carrying out the present invention, it is my purpose to provide a street sweeping machine which may be readily and quickly coupled or connected to the rear end of a wagon or other wheeled receptacle and drawn along thereby and which will sweep up the refuse from the surface of the roadway and deliver such refuse and dust to the wagon or receptacle thereby enabling the dirt to be carted away.

It is also my purpose to provide a machine of the class described which will embrace the desired features of simplicity, efficiency and durability, which will operate effectively for its intended purpose and which may be rapidly connected with and detached from the wagon or other vehicle.

With the above and other objects in view, the invention consists in the construction, combination and arrangement of parts hereinafter set forth in and falling within the scope of the claim.

In the accompanying drawings: Figure 1 is a view in side elevation of a street sweeping machine and wheeled vehicle connected together. Fig. 2 is a longitudinal sectional view through the machine. Fig. 3 is a transverse sectional view therethrough.

Referring now to the drawings in detail, 1 designates a frame comprising longitudinal bars 2, 2 spaced apart in parallelism. Arranged transversely of the bars 2, 2 of the frame approximately centrally thereof and secured thereto is an axle 3 and rotatably mounted upon the opposite extremities of the axle 3 are ground wheels 4, 4. The bars 2, 2 at one side of the axle 3 incline downwardly and journaled in the lower ends of the downwardly inclined portions of the bars is a shaft 5 upon which are keyed sprocket wheels 6, 6 spaced apart. The remaining portions of the bars 2, 2 extend upwardly from the axle and journaled in the upper ends thereof is a shaft 7 carrying sprocket wheels 8, 8 spaced apart. Over the sprocket wheels 6 and 8 are trained endless chains 9 spaced apart and traveling in parallel paths. Suitably fastened to the outer edges of the chains 9 and extending across the same are brushes 10 spaced apart appropriate distances. Fastened to the longitudinal bars 2, 2 of the frame at one side of the axle 3 are vertically disposed bars 11 and journaled in the lower ends of the bars 11 are axially alining trunnions carried by the opposite ends of a roller 12, while journaled in the upper ends of the bars 11 are the trunnions at the opposite ends of a roller 13. The rollers 12 and 13 bear against the lower and upper runs of the chains and so hold the latter taut, while the lower roller 12 coöperates with the sprocket wheels 6 in such manner as to hold those portions of the lower runs of the chains between the roller 12 and the sprocket wheels 6 in a substantially horizontal plane whereby the brushes 10, carried by such horizontal portions of the chains will contact with and sweep over the surface of the roadway being cleaned.

In the present instance, the driving mechanism for the chains 9 carrying the brushes comprises a gear wheel 14 loosely surrounding the axle and meshing with a pinion 15 rotatably mounted upon a stub shaft 16 carried by the adjacent side bar 2 of the frame. Also surrounding the stub shaft 16 and fixed to the pinion thereon is a sprocket wheel 17, while keyed to the shaft 5 journaled in the lower ends of the side bars of the frame is a sprocket wheel 18 and trained over the sprocket wheels 17 and 18 is an endless drive chain 19. Keyed to the axle 3 adjacent to one face of the gear wheel 14 is a ratchet wheel and engaging the teeth of the ratchet wheel is a pawl carried by the gear wheel 14, as clearly illustrated in Fig. 2, whereby motion will be transmitted to the gear wheel 14 in the forward movement of the machine while the ground wheels will rotate idly in the reverse movement of the machine. Thus, in the forward movement of the machine, the gear wheel 14 drives the pinion 16 and sprocket wheel 17 and the latter, through the medium of the chain 19, rotates the shaft 5, thereby imparting motion to the belts 9 with the effect to cause the brushes 10 to contact with the surface of the roadway over which the machine is traveling. Fastened to the side bars 2 of the supporting frame are the side walls of a casing 20 inclosing the chains and brushes and the driving mechanism and having the side walls thereof formed with alining openings through which the axle is passed. The lower edges of the side walls of the casing 20 are cut to conform to the path of movement of the lower runs of the chains 9 and lie in a plane below and parallel with such paths. Fastened to the upwardly inclined portions of the lower edges of the side walls of the casing 20 and arranged transversely thereof is a dust pan 21 having the lower end thereof disposed below the forward end of the horizontal portions of the lower runs of the chains 9 and the upper extremity terminating in a downwardly projecting discharge spout 22 formed by the forward end of the casing 20. The dust pan 21 lies in a plane parallel with the upwardly inclined portions of the lower runs of the chains 9 and in the travel of the chains the brushes thereon ride upon and over the dust pan 21 and carry the dirt and refuse over such pan and into the spout 22.

Loosely connected with the outer ends of the axle 3 and extending forwardly of the machine are connecting bars 23 disposed parallel with each other and having the forward ends thereof interconnected by means of an end bar 24 equipped with a coupling member 25. In practice, the coupling member 25 is secured to the rear end of a wagon or wheeled receptacle and the spout 22 disposed over the body of such receptacle and in communication therewith, and surrounding the lower end of the spout 22 and secured to the top or cover of the body of the wagon is a cloth hood 26 whereby the escape of dust and dirt is prevented. By means of this construction, it will be seen that as the wagon is drawn along over the surface of the roadway in a forward direction the sweeping machine will follow such wagon and in the rotation of the ground wheels 4 the gear wheel 14 and pinion 15 will rotate the sprocket wheel 17 to impart movement to the chain 19 and shaft 5 whereby the endless chains 9 carrying the brushes 10 will be actuated to cause the brushes to wipe over the surface of the road and carry the dirt and refuse therefrom onto the dust pan 21 and discharge the same into the spout 22 whence it drops into the body of the wagon, as clearly illustrated in Fig. 2 of the drawings.

In order to reinforce the brushes 10 so as to prevent lateral movement thereof when contacting with the road surface, the reinforcing rods 27 are secured to the rear edges of the backs of the brushes and extend rearwardly therefrom, such rods bearing against bars 28 secured to the chains 9 and arranged transversely thereof.

29 designates a rod having one end thereof pivotally connected with one of the side bars 2 adjacent to the forward end thereof and depending therefrom. The lower end of this rod 29 is passed through and works within a slot 30 formed in the adjacent connecting bar 23 and pivoted adjacent to the lower end of the rod 29 is a hand lever 31 capable of swinging movement and having one end thereof pivotally connected with the lower extremity of the rod 29 and the opposite end connected through the medium of an actuating rod with a controlling lever located within convenient reach of the operator 32. Encircling the rod 29 is a coiled contractile spring 33 having one end secured to the rod 29 and the opposite extremity fastened upon the upper edge of the connecting bar 23. Normally, the spring 33 acting upon the rod 29 holds the brushes in engagement with the ground so that as the machine is drawn along dirt and refuse will be deposited within the wagon, while when the lever 31 is swung about its pivotal connection with the connecting bar 23 the rod 29 moves downwardly, incident to the pivotal connection between such rod and the lower end of the lever, thereby moving the brushes out of engagement with the ground.

From the foregoing description taken in connection with the accompanying drawings, the construction, mode of operation and manner of employing my improved street sweeping machine will be readily apparent. It will be seen that I have provided a street sweeping machine which may be coupled to the back of a wagon and whereby the dirt and refuse will be swept up and delivered to the wagon or receptacle so that the same may be carted away.

While I have herein shown and described one preferred form of my invention by way of illustration, I wish it to be understood that I do not limit or confine myself to the precise details of construction herein described and delineated, as modification and variation may be made within the scope of the claim without departing from the spirit of the invention.

I claim:

A two wheeled street sweeping machine comprising an axle, ground wheels on the ends of said axle, a frame mounted on said axle and capable of swinging movement thereon, brushes carried by said frame, means for operating said brushes, connecting bars secured to said axle and projecting forwardly thereof, one of said bars having a slot formed therein, a vertical rod having the upper end thereof pivotally connected to said frame above the connecting bar and the lower end projecting through the slot in said connecting bar, a lever pivoted adjacent to its lower end upon said connecting bar, a pivotal connection between the lower end of said lever and the adjacent end of said rod, means for swinging said lever to draw said rod downwardly and swing said frame about the axle to move the brushes out of engagement with the ground, and a spring encircling said rod above said connecting bar and having the upper end thereof connected to said rod and the lower end abutting said bar and acting to hold the frame normally in position to engage the brushes with the ground.

In testimony whereof I affix my signature in presence of two witnesses.

LEWIS J. LOCKWOOD.

Witnesses:
CHARLES F. LOCKWOOD,
CHARLES MAJORY.